Nov. 27, 1928.
E. H. FRENCH
1,693,586
PROCESS OF RECOVERING RESINOUS BY-PRODUCTS
IN THE MANUFACTURE OF WOOD PULP
Filed Aug. 15, 1925
2 Sheets-Sheet 1
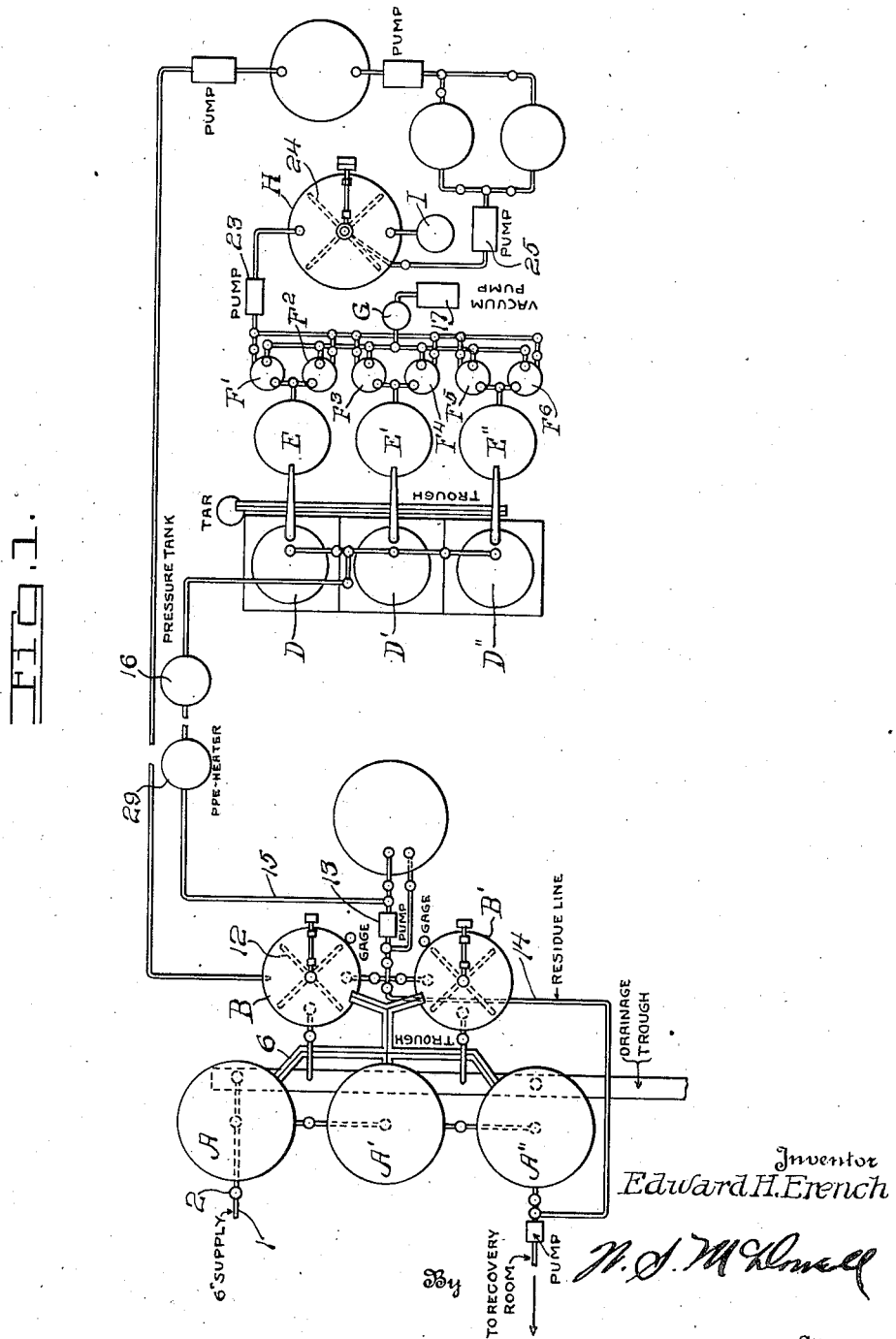

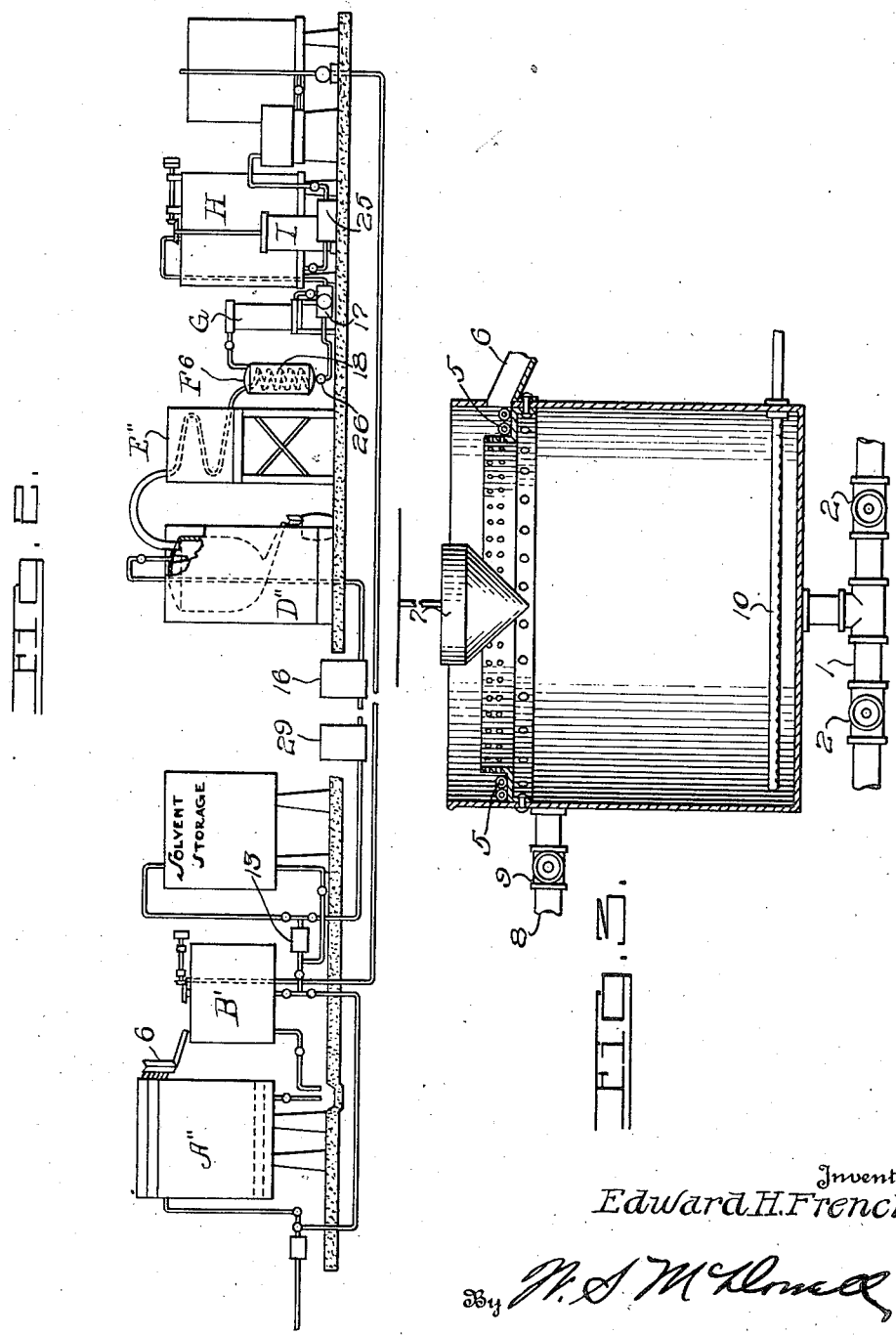

Patented Nov. 27, 1928.

1,693,586

UNITED STATES PATENT OFFICE.

EDWARD H. FRENCH, OF COLUMBUS, OHIO.

PROCESS OF RECOVERING RESINOUS BY-PRODUCTS IN THE MANUFACTURE OF WOOD PULP.

Application filed August 15, 1925. Serial No. 50,526.

In the manufacture of paper pulp produced from resinous woods by the so-called "sulphate" process the wood is cleaned and chipped, placed in a digester where it is treated with a solution containing sodium sulphid ($Na_2S$) and caustic soda ($NaOH$), the wood being cooked with steam under pressure in this liquor for a period of several hours. The turpentine of the mass is recovered by distillation and the digester "blown", the pulp separated from the pulping liquor (sometimes called "black liquor") evaporated to a thin paste and burned in a furnace for the purpose of consuming the organic matter and converting the sulphates formed into the sulphids and carbonates.

During the described operation the pulping or black liquor referred to acquires a large quantity of resin and resin oils in the form of sodium resinate resulting from the combination of the caustic soda with the abietic acid of the rosin of the wood. Many attempts have been made to recover the sodium resinates but, as far as I am aware, without commercially satisfactory results. Among such attempts may be instanced (1) the cooling of the liquor thereby separating a portion of the resin and (2) the precipitating or "salting out" the resins by the use of additional alkali or salt, but by such methods the quantity obtained is small and upon refining the product does not prove satisfactory.

In the plants operating on resinous woods for the manufacture of wood pulp, resin containing black liquor has only fuel value in the black ash furnace used to decompose the sodium sulphate into sodium carbonate and sodium sulphid.

The object of this invention therefore is an improved and economical method of recovering the resinous content of such pulping liquor, especially that resulting from the sulphate or soda process, in a form and a quality equalling, if not superior to, that obtained directly from the crude resin gum.

My invention is particularly productive in treating the liquor obtained from the stumpage of the long leaf pine which contains 400 to 700 pounds of rosin to the cord, but its employment is profitable in the treatment of liquors obtained from the pulping of woods having a smaller content of rosin.

The chemical formula of the abietic acid is given by some authorities as $C_{20}H_{30}O_2$ and by others as $C_{19}H_{28}O_2$ thus signifying a molecular weight of approximately 302 and 288 respectively.

In the "sulphate" process of manufacturing pulp the usual source of the alkali employed is derived from "salt cake" (sodium sulphate $Na_2SO_4$) which after passing through the black ash furnace in the presence of organic matter is changed to sodium carbonate and sodium sulphid as before indicated. Therefore assuming, as an example, that the rosin content of a cord of wood is 500 pounds there will be required about 100 to 125 pounds of salt cake to produce the amount of sodium hydroxid or sulphid necessary to neutralize the abietic acid content of the resinous matter of such wood. The sodium resinate contained in the spent pulp liquor is soluble in the liquor.

In carrying out my process I add sufficient nitre cake (sodium acid sulphate $NaHSO_4$) to the black liquor above referred to and according to its alkalinity and rosin content to precipitate all the rosin from the sodium resinate this reaction being accompanied by released and precipitated ligneous acids. Nitre cake, being sodium acid sulphate, is considered herein on account of its acid properties as constituting present purposes an acid. Instead of nitre cake, sulphuric acid or other suitable acid may be employed. By this means the combined sodium of the resinate and wood acids are changed into sulphates which in passing through the standard black ash furnace are again converted into the sodium sulphid and sodium carbonate both of which may be again used for pulping. From this process there results an additional quantity of sodium sulphate due to the use of the nitre cake, such additional quantity amounting to about 50 per cent of the cake used. By my process therefore I simultaneously secure two valuable results namely: recovery of rosin from the spent pulping liquor and the sodium sulphate at very low cost. The amount of nitre cake needed for complete precipitation should be determined in each batch of spent liquor by analyzing it for alkalinity and sodium resinate by the standard methods of analysis for rosin content, because the resinous content of wood varies according to the variety of wood used as well as according to the part of the tree from which it comes.

In the black ash furnace, above mentioned, which is used for the purpose of converting the sodium sulphate into sodium sulphide and sodium carbonate, the reaction taking place forms sulphur dioxid which goes into the atmosphere as an objectionable fume. Should nitre cake be unavailable at commercial costs I pass the gases formed in the furnace through the black liquor to avoid the expense of sulphuric acid, the sulphur dioxid created when the sodium sulphate is heated in the presence of organic matter forming sulphurous acid with the water present which precipitates the rosin from the sodium resinate in the same manner as takes place when nitre cake or sulphuric acid is used. This procedure not only precipitates the rosin and wood acids but at the same time eliminates the objectionable fumes referred to.

In the acompanying drawings:

Figure 1 is a plan view of the apparatus employed in carrying out the present invention.

Fig. 2 is a side elevation thereof; and

Fig. 3 is a vertical sectional view of the tank employed in the separation of the rosin from the black liquor.

One convenient method for carrying out the first step of my process, that is; the converting of the soluble sodium resinate in the black liquor into rosin, is shown in the accompanying drawings in which Fig. 1, A′, A″ and A‴ are tanks which permit of the treatment of the black liquor for the purpose of liberating the rosin from the sodium resinate. Fig. 3 is a cross section of any of the tanks A′, A″ and A‴. At the upper part of the tanks A′, A″ and A‴ in a circular trough or colander having the upper part perforated and within this colander are the steam coils 5. The colander is provided with the rosin outlet trough 6. Suspended in the center of the top of the tanks A′, A″, and A‴, are the conical deflectors 7. Immediately below the colander is the black liquor outlet 8, having the valve 9 for regulation purposes. Near the bottom of the tanks A′, A″ and A‴ are the perforated coils 10.

To carry out this first step of the operation, the black liquor is fed into the tank A′ through the feed line 1, the flow being regulated by the valve 2. After the tank has been filled to a point above the outlet 8, the valve 9 is regulated so that the height of the liquor is below the openings in the side of the colander. Acid in a gaseous form as that from the black ash furnaces as described above, containing sulphur dioxid, or from other suitable source is pumped through the perforated coil 10 thereby immediately liberating the rosin from the sodium resinate causing it to rise immediately to the top of the liquid.

The next step in my process is to separate the precipitate from the liquor described which I do by decantation or filtering. This decantation is aided by the conical deflector 7 shown in Fig. 3, the impure rosin being carried into the trough 6 by means of the colander heated by the steam coils 5 and hence into the solvent tanks B and B′. The precipitate, which contains many impurities such as wood acids and other ligneous matter, is then digested at atmospheric pressure with an organic solvent such as benzol, gasoline, toluol or kerosene in quantity sufficient to dissolve the rosin and rosin oils. This dissolving of the rosin and rosin oils can be carried out at ordinary temperatures by means of the agitator 12, Fig. 1. After dissolving has been accomplished the agitator is stopped and the dissolved rosin ready for distillation.

The solution of resinous bodies resulting from this digestion is then distilled under a reduced pressure and when carried out in a glass apparatus with about 4 cm. mercury pressure, it can be distilled over with the rosin practically undecomposed, but in iron stills it is difficult to prevent some decomposition of the rosin into a hydrocarbon variously known as colophene or abietene and which is the resultant produced when the carboxyl group of the rosin acid has been eliminated.

Because of the decomposition which takes place when the pressure is increased or in the presence of metals, it is advisable in the distilling operation in a metallic still referred to, to still further reduce the boiling point of the rosin by first preheating the solution of rosin and atomizing the mixture by means of pressure on the liquid, forcing it through a spray or atomizing nozzle into a vacuumized chamber and condensing fractionally both the organic solvent and the rosin contained therein, the vapor from the organic solvent thus serving sufficiently to reduce the boiling point of the rosin itself and therefore prevent its decomposition. The resultant crystallizable rosin distillate is then filter pressed from any oils condensed with it and then heated to put into melted form. In this manner a very pure rosin is obtained free from objectionable impurities.

By referring to Fig. 1 and Fig. 2 of the drawings it can be seen how this step can be carried out. The solution of rosin in gasoline in the solvent tanks B and B′ is pumped by the pump 13 through the line 15 to preheater 29 where it is heated and thence to the pressure tank 16. Here a pressure is maintained sufficiently high to atomize the rosin mixture into the stills D, D′ and D″ which are equipped with condensers E, E′ and E″ and distillate receiving tanks F′ to F⁶. A high vacuum is maintained by vacuum pump 17 which is connected through condenser G.

In case rosin itself is to be produced and not sodium resinate, then condensers E, E′ and E″ are maintained sufficiently hot by the absence of cooling water to maintain the solvent in gaseous form but sufficiently cool to condense the rosin. The steam coil 18 is provided for the purpose of maintaining the receiving tanks F' to F⁶ at a temperature to prevent the condensation of the solvent, which passes to condenser G and is there condensed and tapped off for further use. The rosin is drawn off through the valve 26.

It is well known that from 35% to 40% of the rosin produced in this country enters into the manufacture of rosin soap and for this purpose the rosin acids are neutralized or saponified with soda ash or caustic soda. I have discovered that the rosin in the organic solution aforementioned either before or after distillation may be recovered from the solution by adding an aqueous solution of an alkali to the rosin solution and agitating the mixture thereby neutralizing the abietic acid which will separate out first as an emulsion but later on standing it will break down so that it will be in solution in the water thus separating the organic solvent which will form a distinct layer on the top that can be decanted to be again used to dissolve succeeding batches. The solution of sodium resinate in water is then evaporated leaving the granular sodium resinate as a residue useful in manufacturing soap or paper size.

When sodium resinate is to be manufactured the entire distillate is condensed in the condensers E, E' and E'' and collected in the receiving tanks F' to F⁶. The condensed material is pumped by means of pump 23 to tank H equipped with agitator 24 condenser I and pump 25 for the purpose of neutralization for resinate production, this procedure being set forth in patent application Serial No. 172,821, filed March 4, 1927, in continuation in part.

The amount of caustic soda used to completely precipitate the abietic acid from its solution in the solvent is determined by titrating a known amount of the solution dissolved in alcohol and ether with a standard alkali solution.

Atomizing pressures depend on the spray nozzle used, these can be worked under pressures from 10 pounds up, depending on volume and type of nozzle used. The temperature of distillation is dependent on the solvent used and the vacuum obtainable, with a good grade of kerosene and an absolute pressure of about 4 cm. of mercury, the temperature range in the liquid will run around 240 degrees centigrade providing two parts of solvent is used to one of the rosin.

What I claim is:

1. A process of recovering rosin from liquors obtained by the alkaline treatment of resinous wood consisting in liberating impure rosin from the alkaline liquors by passing an acid gas through said liquor, removing said liberated rosin from said liquor, dissolving the removed impure rosin in a hydrocarbon solvent, distilling the solution of rosin and solvent under a high vacuum, condensing and separating the rosin from the solvent.

2. A process of recovering rosin from liquors obtained by the alkaline treatment of resinous wood consisting in liberating impure rosin from the alkaline liquors by passing sulphur dioxid gas through said liquor, removing said liberated rosin from said liquor, dissolving the removed impure rosin in a hydrocarbon solvent, distilling the solution of rosin and solvent under a high vacuum, condensing and separating the rosin from the solvent.

3. In a process of obtaining rosin from the resinates contained in alkaline pulping liquors in which the resinate is decomposed by a mineral acid forming rosin which has been mixed with an organic solvent, the step of distilling such rosin solvent mixture under high vacuum.

4. In a process of obtaining rosin from the resinates from liquors obtained by the alkaline treatment of resinous wood in which the resinate is decomposed by a mineral acid forming rosin which is mixed with an organic solvent, the step of distilling such rosin solvent mixture under high vacuum.

5. In a process of obtaining rosin from the resinates from liquors obtained by the alkaline treatment of resinous wood in which the resinate is decomposed by a mineral acid forming impure rosin, the steps which comprise mixing the said rosin with an organic solvent, distilling the solution under a vacuum, and separately condensing the solvent and rosin whereby the distilled crystallizable rosin is separated from the solvent.

6. In a process of producing rosin from the resinates from liquors obtained by the alkaline treatment of resinous wood in which the resinate has been decomposed by a mineral acid forming rosin which latter is mixed with an organic solvent, the step of distilling such rosin-solvent mixture under a vacuum and fractionately separating the distilled crystallizable rosin from the solvent and filtering the rosin whereby very pure rosin, free from objectionable impurities, is obtained.

EDWARD H. FRENCH.